US012288110B2

(12) United States Patent
Hirose

(10) Patent No.: US 12,288,110 B2
(45) Date of Patent: Apr. 29, 2025

(54) INFORMATION PROCESSING APPARATUS, INSPECTION SYSTEM, INFORMATION PROCESSING METHOD, AND STORAGE MEDIUM FOR INSPECTING PRINTED MATERIAL

(71) Applicant: CANON KABUSHIKI KAISHA, Tokyo (JP)

(72) Inventor: Fumiaki Hirose, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/462,575

(22) Filed: Sep. 7, 2023

(65) Prior Publication Data

US 2024/0086663 A1 Mar. 14, 2024

(30) Foreign Application Priority Data

Sep. 13, 2022 (JP) ................................ 2022-145599

(51) Int. Cl.
*G06K 15/02* (2006.01)
*H04N 1/00* (2006.01)

(52) U.S. Cl.
CPC ..... *G06K 15/1836* (2013.01); *H04N 1/00037* (2013.01)

(58) Field of Classification Search
CPC ............. G06K 15/1836; G06K 15/005; G06K 15/408; H04N 1/00037; G06F 3/12; G06F 3/1208; G06F 3/1282; G06F 3/1285
See application file for complete search history.

(56) References Cited

U.S. PATENT DOCUMENTS

2011/0055694 A1* 3/2011 Matsui ................. G06K 15/005 715/274
2014/0168709 A1* 6/2014 Tokumaru .......... H04N 1/00278 358/1.18
2023/0297297 A1* 9/2023 Ishikawa ............... G06F 3/1256 358/1.15
2023/0306586 A1* 9/2023 Tanaka .................. G06F 3/1208

FOREIGN PATENT DOCUMENTS

JP 2021107788 A 7/2021

OTHER PUBLICATIONS

JP-2023143201 (Tanaka, Machine Translated Document attached, filed on Mar. 25, 2022) (Year: 2022).*

* cited by examiner

*Primary Examiner* — Juan M Guillermety
(74) *Attorney, Agent, or Firm* — ROSSI, KIMMS & McDOWELL LLP

(57) ABSTRACT

To make it possible to easily set an inspection level in accordance with the type of contents included in a printed material. First, based on PDL included in a print job, a raster image is generated and a contents attribute different from an object attribute predefined by the PDL is identified by analyzing the raster image. Then, inspection level information in accordance with the identified contents attribute is assigned to the generated raster image and the raster image is provided to an inspection apparatus.

13 Claims, 13 Drawing Sheets

Inspection Level Setting 500

| Contents attribute | Inspection level |
|---|---|
| person | level 3 ▼ |
| landscape | level 2 ▼ |
| character string | level 1 ▼ |
| barcode | level 2 ▼ |
| margin | inspection not necessary ▼ |

[ Set level threshold value ]

[ Cancel ] [ OK ]

Inspection Level Setting 510

|  | Lv 3 | Lv 2 | Lv 1 | Off |
|---|---|---|---|---|
| person | ● | ○ | ○ | ○ |
| landscape | ○ | ● | ○ | ○ |
| character string | ○ | ○ | ● | ○ |
| barcode | ○ | ● | ○ | ○ |
| margin | ○ | ○ | ○ | ● |

[ Set level threshold value ]

[ Cancel ] [ OK ]

| Inspection level | Threshold value | | |
|---|---|---|---|
| | circular defect | muscular defect | positional shift |
| level 1 | not less than 0.5 mm and not more than 1 mm | | |
| level 2 | not less than 0.3 mm and not more than 0.5 mm | | |
| level 3 | not more than 0.3 mm | | |

FIG.7

INFORMATION PROCESSING APPARATUS, INSPECTION SYSTEM, INFORMATION PROCESSING METHOD, AND STORAGE MEDIUM FOR INSPECTING PRINTED MATERIAL

BACKGROUND

Field

The present disclosure relates to control of an inspection system that inspects a printed material.

Description of the Related Art

An inspection apparatus is known, which inspects a defect, such as soiling, missing print, erroneous character, and poor barcode quality, by reading a printed material printed by a printing apparatus. In inspection, a threshold value (inspection level) set in advance for each type of defect is used. Then, in actual inspection, a method is generally used in which an image obtained by scanning a printed material and an image called "reference image (correct answer image)" in the state where there is no defect are compared and a defect in accordance with the above-described inspection level is detected based on the difference between both images. Then, a technique has been proposed (Japanese Patent Laid-Open No. 2021-107788), which automatically sets an inspection area and an inspection level based on PDL information included in print data in order to set an inspection level different for each area within a printed material.

With the technique of Japanese Patent Laid-Open No. 2021-107788 described above, it is possible to set an inspection area and an inspection level for each type of object that can be determined at the time of interpretation of PDL, specifically, for each object attribute, such as text, graphics, and image. However, the classification according to the above-described object attribute does not necessarily match the classification according to contents (for example, person, character string, barcode and the like) a user can grasp intuitively. Further, it is not possible for the technique of Japanese Patent Laid-Open No. 2021-107788 described above to deal with a situation where it is desired to change the inspection level, for example, between a case where the area of the image attribute within a page is a person and a case where that is other than a person, and therefore, it is necessary for a user to designate the area within the page and set a desired inspection level individually.

SUMMARY

The information processing apparatus according to the present disclosure has: one or more memories storing instructions; and one or more processors executing the instructions to: generate a raster image based on a print job of a printed material; identify a contents attribute different from an object attribute predefined by the print job by analyzing the raster image; assign inspection level information in accordance with the identified contents attribute to the generated raster image; and output the raster image to which the inspection level information is assigned for use as a reference image in the inspection.

Further features of the present disclosure will become apparent from the following description of exemplary embodiments with reference to the attached drawings.

BRIEF DESCRIPTION OF THE DRAWINGS

FIG. 7 is one example of a table storing a threshold value for each inspection level;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
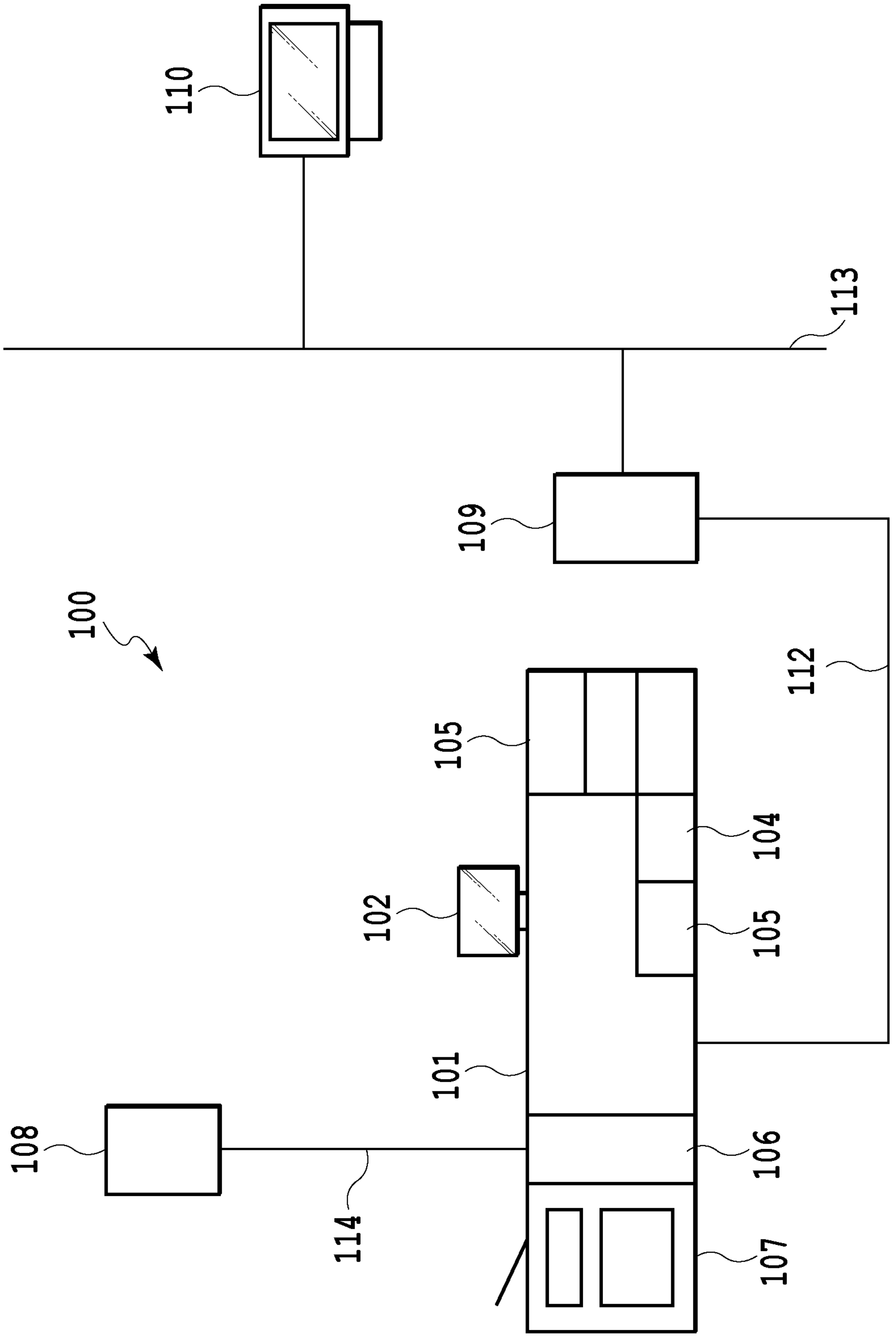
FIG. 1 is a diagram showing one example of a configuration of an inspection system.

FIG. 1 is a diagram showing one example of a configuration of an inspection system according to the present embodiment. An inspection system 100 has an image forming apparatus 101, an inspection apparatus 108, and an external controller 109. The image forming apparatus 101 and the inspection apparatus 108 are connected so as to be capable of communication via an internal LAN 114 and the image forming apparatus 101 and the external controller 109 are connected so as to be capable of communication via an internal LAN 112. Further, the external controller 109 is connected with a client PC 110 so as to be capable of communication via an external LAN 113.

The image forming apparatus 101 comprises a UI panel 102 and sheet feed decks 103 and 104. Further, an optional deck 105 including a three-tray sheet feed deck is connected. The image forming apparatus 101 is, for example, an electrophotographic printing apparatus. Further, the UI panel 102 is a user interface comprising, for example, a capacitance touch panel. Furthermore, the image forming apparatus 101 comprises an inspection unit 106 and a large-capacity stacker 107. The inspection unit 106 is connected with the inspection apparatus 108 via the internal LAN 114. The large-capacity stacker 107 comprises a main tray and a top tray and it is possible to stack thousands of printing sheets (in the following, described as "sheets") on the main tray at a time. It may also be possible to connect, for example, a finisher capable of stapling, a folding machine, a bookbinding machine and the like to the image forming apparatus 101, in addition to the inspection unit 106 and the large-capacity stacker 107. That is, the system configuration shown in FIG. 1 is merely one example and it is needless to say that there are a variety of connection patterns other than that shown in the present embodiment.

A print job is generated in the client PC 110, transmitted to the external controller 109 via the external LAN 113, and managed in the external controller 109. Then, the print job is transmitted from the external controller 109 to the image forming apparatus 101 through the internal LAN 112 and print processing in accordance with the print job is performed in the image forming apparatus 101. An aspect may be accepted in which a print job is generated and managed in the external controller 109, which is an information processing apparatus, and transmitted to the image forming apparatus 101 via the internal LAN 112 and managed in the image forming apparatus 101.

<Internal Configuration of Inspection System>

Figure 2:
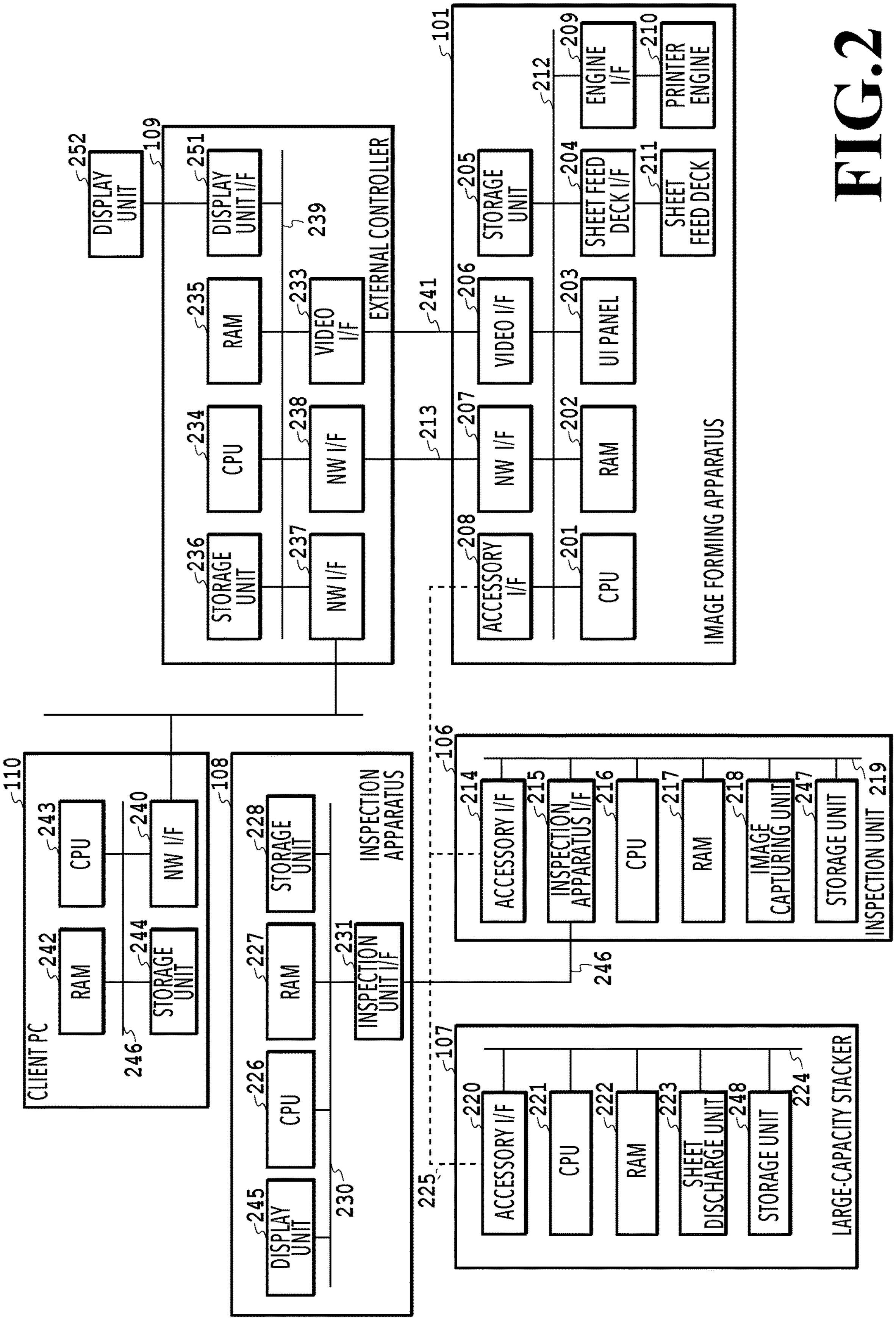
FIG. 2 is a block diagram showing an internal configuration of each device configuring the inspection system.

FIG. 2 is a block diagram showing the internal configuration of the image forming apparatus 101, the inspection unit 106, the inspection apparatus 108, the large-capacity stacker 107, the external controller 109, and the client PC 110, which configure the inspection system 100. In the following, explanation is given in order.

<<Internal Configuration of Image Forming Apparatus>>

A CPU (Central Processing Unit) 201 administers control and computation in each unit within the image forming apparatus 101 via a system bus 212. The CPU 201 loads a program stored in a storage unit 205 onto a RAM (Random Access Memory) 202 and executes the program. The RAM 202 is one general type of volatile storage device that can be accessed directly from the CPU 201 and is used as a work area of the CPU 201 or as another temporary data storage area. The storage unit 205 functions as a temporary storage area and a work memory at the time of operation. An engine I/F 209 administers communication with and control of a printer engine 210. A sheet feed deck I/F 204 administers communication with and control of a sheet feed deck 211. The sheet feed deck 211 is a general term in a case where the sheet feed decks 103 and 104 and the optional deck 105 described above are represented as one hardware configuration. A UI panel 203 is the hardware configuration of the UI panel 102 and is a user interface for performing the entire operation of the image forming apparatus 101. In the present embodiment, it is assumed that the UI panel 203 comprises a capacitance touch panel. A network interface (in the following, network I/F) 207 is connected with a network I/F 238 of the external controller 109 via a cable 213 and administers communication between the external controller 109 and the image forming apparatus 101. A video I/F 206 is connected with a video I/F 233 via a video cable 241 and administers communication of image data between the external controller 109 and the image forming apparatus 101. An accessory I/F 208 is connected with an accessory I/F 214 and an accessory I/F 220 via a cable 225. That is, the image forming apparatus 101 communicates with the inspection unit 106 and the large-capacity stacker 107 via the accessory I/Fs 208, 214, and 220.

<<Internal Configuration of Inspection Unit>>

A CPU 216 administers control and computation in each unit within the inspection unit 106 and execution of various programs via a system bus 219. ARAM 217 is one general type of volatile storage device that can be accessed directly from the CPU 216 and is used as a work area of the CPU 216 or as another temporary data storage area. A storage unit 247 functions as a temporary storage area and a work memory at the time of operation. An inspection apparatus I/F 215 is connected with an inspection unit I/F 231 via a cable 246. That is, the inspection unit 106 performs communication with the inspection apparatus 108 via the inspection apparatus I/F 215 and the inspection unit I/F 231. An image capturing unit 218 comprises, for example, an image capturing function, mounting a contact image sensor (in the following, CIS), and captures a sheet passing within the inspection unit 106 and transmits the captured image to the inspection apparatus 108 via the inspection apparatus I/F 215. The CIS for the image capturing unit 218 is one example of a sensor and the sensor may be another type of sensor, such as a CCD image sensor, and the image capturing method thereof is not limited.

<<Internal Configuration of Large-Capacity Stacker>>

A CPU 221 administers control and computation in each unit within the large-capacity stacker 107 and execution of various programs via a system bus 224. ARAM 222 is one general type of volatile storage device that can be accessed directly from the CPU 221 and is used as a work area of the CPU 221 or as another temporary data storage area. A storage unit 248 functions as a temporary storage area and a work memory at the time of operation. A sheet discharge unit 223 administers monitoring and control of the sheet discharge operation to the main tray and the top tray and the stacking situation of each of the main tray and the top tray.

<<Internal Configuration of Inspection Apparatus>>

A CPU 226 administers control and computation in each unit within the inspection apparatus 108 and execution of various programs via a system bus 230. A RAM 227 is one general type of volatile storage device that can be accessed directly from the CPU 226 and is used as a work area of the CPU 226 or as another temporary data storage area. A storage unit 228 functions as a temporary storage area and a work memory at the time of operation. A display unit 245 is, for example, a liquid crystal display that is connected to the inspection apparatus 108 and receives a user input to the inspection apparatus 108, displays the state of the inspection apparatus 108, and so on.

<<Internal Configuration of External Controller>>

A CPU 234 comprehensively controls each unit within the external controller 109 via a system bus 239. The CPU 234 performs display control to display various user interface screens, to be described later, on a display unit 252 via, for example, a display unit I/F 251 by executing a predetermined program. A RAM 235 is one general type of volatile storage device that can be accessed directly from the CPU 234 and is used as a work area of the CPU 234 or as another temporary data storage area. A storage area 236 functions as a temporary storage area and a work memory at the time of operation. A network interface (in the following, network I/F) 237 is connected with a network I/F 240 of the client PC 110 via a network. Further, the external controller 109 performs communication with the client PC 110 via the network I/F 237 and the network I/F 240.

Further, an aspect may be accepted in which the inspection apparatus 108 has a network I/F and the external controller 109 performs communication with the inspection apparatus 108 via the network I/F and the network I/F 237. Here, a case is considered where a RIP inspection method (inspection method in which the RIP image the image forming apparatus 101 uses in print processing is used as a reference image) is employed as an inspection method. In this case, the reference image may be transmitted to the inspection apparatus 108 through the inspection apparatus I/F 215, or may be transmitted from the network I/F comprised by the inspection apparatus 108 to the inspection apparatus 108 through the network I/F 207 and the network I/F 237.

<<Internal Configuration of Client PC>>

A CPU 243 administers control and computation in each unit within the client PC 110 and execution of various programs via a system bus 246. ARAM 242 is one general type of volatile storage device that can be accessed directly from the CPU 243 and is used as a work area of the CPU 243 or as another temporary data storage area. A storage area 244 functions as a temporary storage area and a work memory at the time of operation.

<Conveyance System of Image Forming Apparatus>

Figure 3:
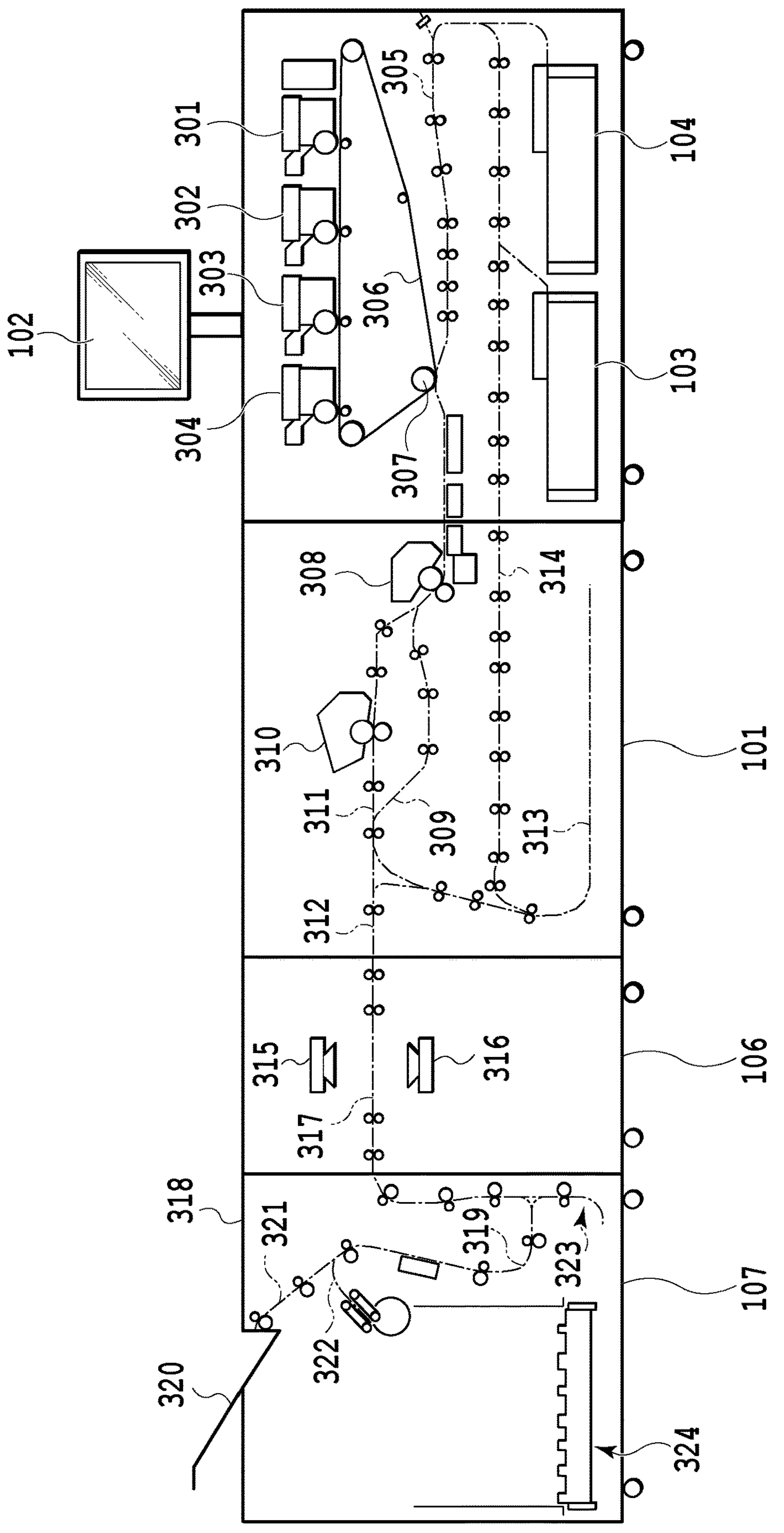
FIG. 3 is mechanical cross-sectional diagram of an image forming apparatus.

Following the above, the conveyance system of the image forming apparatus 101 is explained. FIG. 3 is a mechanical cross-sectional diagram of the image forming apparatus 101. In the following, explanation is given along FIG. 3.

The image forming apparatus 101 receives an input of a user via the UI panel 102, displays a progress situation of print processing and setting information on the apparatus, and so on. It is possible to store different types of sheet on the sheet feed decks 103 and 104. It is possible for each sheet feed deck to separate only one sheet located at the uppermost position of a stored sheet bundle and convey the sheet to a conveyance path 305. Developing stations 301 to 304 each form a toner image by using colored toner of Y (yellow), M (magenta), C (cyan), and K (black), respectively, in order to form a color image. The toner image formed here is primarily transferred onto an intermediate transfer belt 306. The intermediate transfer belt 306 rotates clockwise and at a secondary transfer position 307, the toner image is transferred onto a sheet conveyed from the conveyance path 305. A fixing unit 308 comprises a pressure roller and a heating roller and fixes the toner image onto the sheet by causing the sheet to pass between each roller to fuse and fix the toner. The sheet having passed through the fixing unit 308 is conveyed to a conveyance path 312 through a conveyance path 309. In a case where the sheet is a sheet type that further requires fusion and fixing to fix the toner, after passing through the fixing unit 308, the sheet is conveyed to a second fixing unit 310 by using the above-described conveyance path. Then, after the additional fusion and fixing are performed, the sheet is conveyed to the conveyance path 312 through a conveyance path 311. Further, in a case of double-sided printing, after the sheet is conveyed to a reversing path 313 and reversed, the sheet is conveyed to a double-sided conveyance path 314 and an image is transferred onto the second side at the secondary transfer position 307.

Within the inspection unit 106, a CIS 315 and a CIS 316 are arranged so as to face each other. The CIS 315 is a sensor for reading the front side of a sheet and the CIS 316 is a sensor for reading the back side of a sheet. The inspection unit 106 scans the sheet conveyed to a conveyance path 317 by using the CIS 315 and the CIS 316 at timing at which the sheet reaches a predetermined position. The mage obtained by the scan is transmitted to the inspection apparatus 108 via the inspection apparatus I/F 215 and the inspection unit I/F 231. The CPU 226 of the inspection apparatus 108 determines whether there is a defect in the received scanned image and notifies the inspection unit 106 of the determination results via the inspection unit I/F 231 and the inspection apparatus I/F 215 again. The CUP 216 of the inspection unit 106 notifies the large-capacity stacker 107 of the received determination results via the accessory I/Fs 214 and 220.

The large-capacity stacker 107 is a stacker capable of stacking a large number of sheets. The large-capacity stacker 107 has a main tray 324 as a tray for stacking sheets. The sheet having passed through the inspection unit 106 enters the large-capacity stacker 107 through a conveyance path 319. The sheet is conveyed from the conveyance path 319 and stacked on the main tray 324 via a conveyance path 322. Further, the large-capacity stacker 107 has a top tray 320 as a sheet discharge tray. The CPU 221 discharges the sheet determined to have a defect by the inspection apparatus 108 onto the top tray. In a case where a sheet is discharged onto the top tray 320, the sheet is conveyed from the conveyance path 319 to the top tray 320 via a conveyance path 321. A reversing unit 323 is used in a case where a sheet is stacked onto the main tray 324. In a case where a sheet is stacked onto the main tray 324, the sheet is revered once in the reversing unit 323 so that the orientation of the incoming sheet and the orientation of the sheet at the time of being stacked are the same. In a case where a sheet is conveyed to the top tray 320, the sheet is discharged as it is without being flipped at the time of stacking, and therefore, the reversing unit 323 is not used.

<Operation Mode Setting of Inspection Apparatus>

Figure 4A:
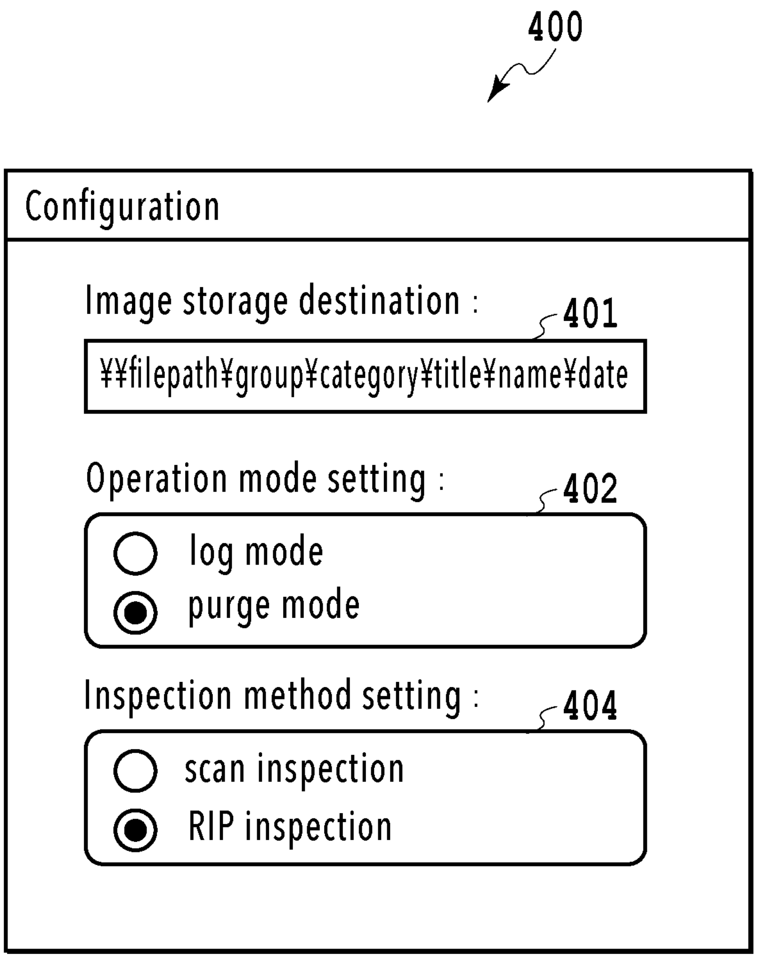
FIG. 4A is one example of a UI screen for setting an operation mode in an inspection apparatus and FIG. 4B is one example of a UI screen for performing recovery setting at the time of the purge mode.
Figure 4B:
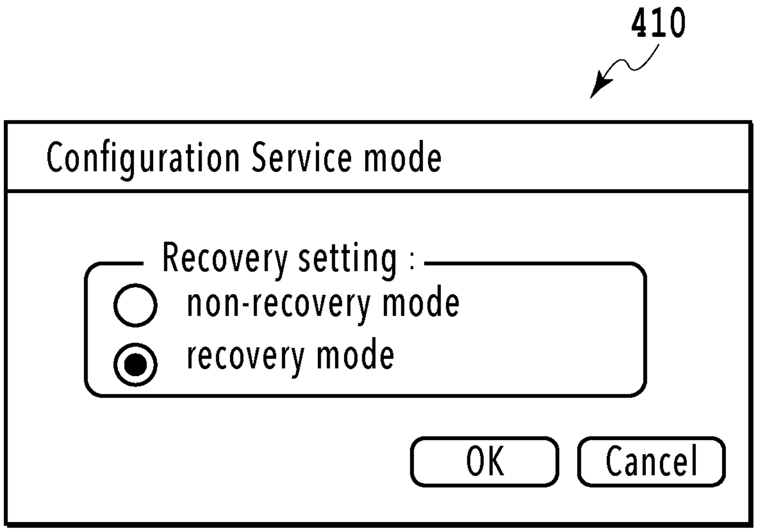

A user performs an input operation necessary for setting of the operation mode by using UI (user interface) screens shown in FIG. 4A and FIG. 4B. In the following, detailed explanation is given.

FIG. 4A is a UI screen for performing setting of the operation mode in the inspection apparatus 108. An operation mode setting screen 400 has an input field 401 for designating the storage destination of a scanned image of a printed material, a mode selection field 402 for selecting an operation mode, and a method selection field 404 for selecting an inspection method. In a case where a user selects "log mode" in the mode selection field 402, the inspected sheet is discharged to the sheet discharge destination designated in advance in the property of a print job irrespective of the inspection results. In a case where a user selects "purge mode" in the mode selection field 402, the sheet whose inspection results indicate "there is a defect (NG)" is discharged onto the top tray 320. Then, in a case where a user selects "scan inspection" in the method selection field 404, inspection using the scanned image of a printed material for which it has been confirmed that there is not a print defect as a reference image is performed. In a case where a user selects "RIP inspection" in the method selection field 404, inspection using the image after RIP processing (in the following, "RIP image") that is used in print processing of the image forming apparatus 101 as a reference image is performed. The present embodiment premises RIP inspection and details of registration processing of a reference image in a case where the RIP image is taken as a reference image will be described later.

FIG. 4B is a UI screen for performing recovery setting at the time of the purge mode. In a case where "purge mode" is selected in the above-described mode selection field 402, contents set on a recovery setting screen 410 shown in FIG. 4B are further reflected. The recovery setting screen 410 is displayed as a popup on the display unit 245 in a case where, for example, "purge mode" is selected. In a case where a user selects "non-recovery mode" (mode in which recovery is not performed) on the recovery setting screen 410, the sheet whose inspection results are "NG" is discharged onto the top tray 320 and the image forming apparatus 101 and the inspection apparatus 108 continue the inspection for the subsequent sheets. On the other hand, in a case where a user selects "recovery mode" (mode in which recovery is performed) on the recovery setting screen 410, in addition to the sheet whose inspection results are "NG", the subsequent fed sheets within the apparatus at the point in time of the determination of "NG" are also discharged onto the top tray 320. Then, in a case where there is no longer a sheet on the conveyance path, the image forming apparatus 101 and the inspection apparatus 108 resume printing and inspection from the sheet corresponding to the sheet for which "NG" has been determined. The inspection apparatus 108 in the present embodiment sequentially captures the printed sheet that is output in the inspection unit 106 and performs inspection in parallel to the print processing in the image forming apparatus 101. Because of this, in a case where the inspection results of a certain sheet become "NG", there is a possibility that the subsequent sheets have already reached the conveyance paths 309 and 311. Unless all the sheets on these conveyance paths are discharged, it is no longer possible to perform the print processing of the print image corresponding to the sheet whose inspection results have become "NG" again and stack the sheets in a correct order to the sheet discharge destination designated in advance in the print job. Consequently, in "recovery mode", the operation such as this is performed. The operation mode, the recovery mode, and the inspection method, which are set as described above, are stored in the RAM 227. Further, the inspection unit 106 is notified of them via the inspection unit I/F 231 and the inspection apparatus I/F 215 and they are stored in the RAM 217.

<Setting of Inspection Level>

Figure 5A:
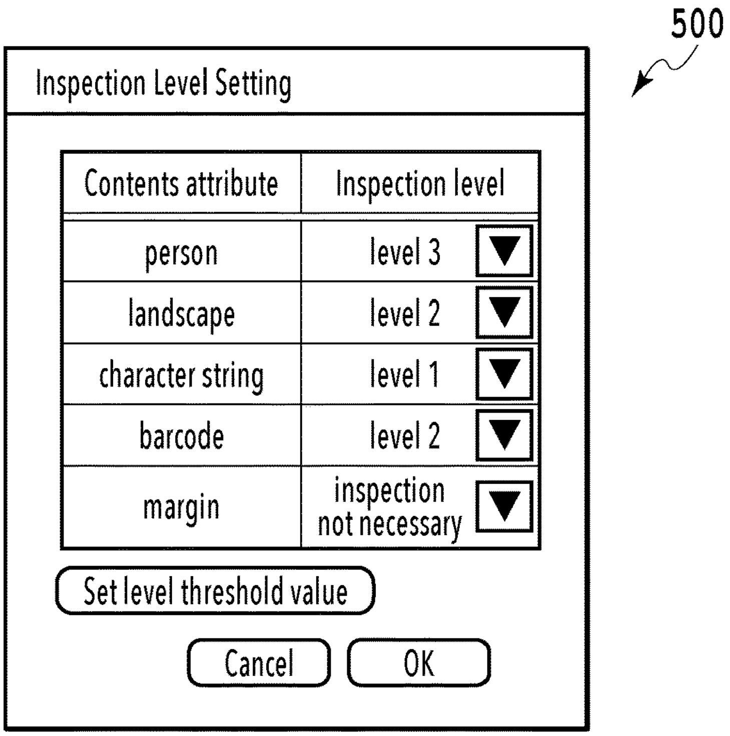
FIG. 5A and FIG. 5B are each one example of a UI screen for setting an inspection level in accordance with a contents attribute.
Figure 5B:
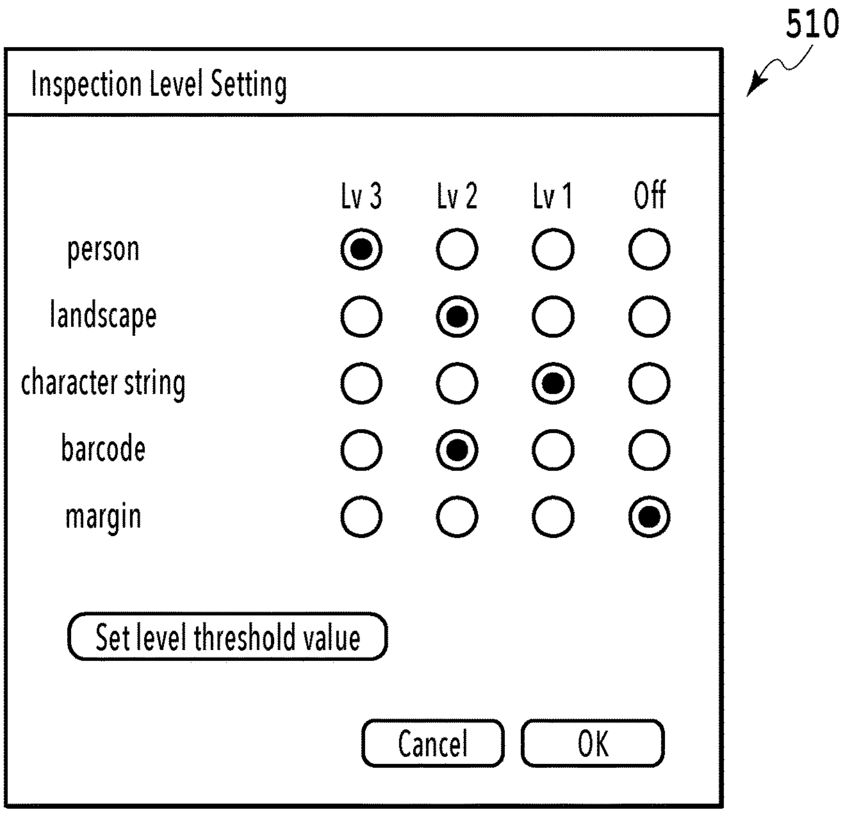

In the present embodiment, which inspection level is applied to each type of contents (contents attribute) formed on a printed material is set in advance by a user prior to the processing to register the reference image for RIP inspection. FIG. 5A and FIG. 5B are each one example of a UI screen (inspection level setting screen) for setting a contents attribute and an inspection level in association with each other according to the present embodiment. A user designates an inspection level in accordance with the contents attribute via the UI screen such as this, which is displayed on the display unit 252 of the external controller 109.

Figure 6:
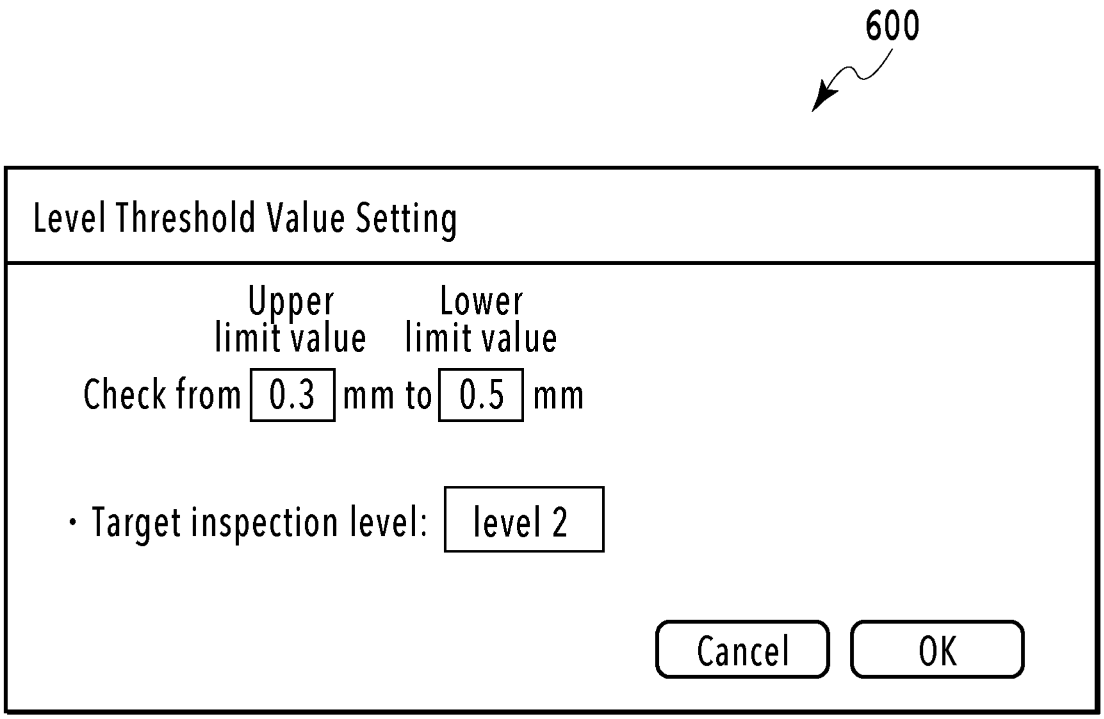
FIG. 6 is one example of a UI screen for setting a detection threshold value at each inspection level.

Both on an Inspection Level Setting screen 500 in FIG. 5A and on an Inspection Level Setting screen 510 in FIG. 5B, "person", "landscape" "character string", "barcode", and "margin" are displayed as contents attributes on the left side of the screen. Then, on the Inspection Level Setting screen 500 in FIG. 5A, a pulldown button for a user to select an inspection level that is applied to each contents attribute is displayed. Further, on the Inspection Level Setting screen 510 in FIG. 5B, radio buttons for a user to select an inspection level that is applied to each contents attribute are displayed. Both on the Inspection Level Setting screen 500 in FIG. 5A and on the Inspection Level Setting screen 510 in FIG. 5B, in a case where an "OK" button is pressed down, the contents being selected at that point in time are stored in the storage unit 236 as the setting value. Then, in a case where a "Set level threshold value" button is pressed down, a UI screen (level threshold value setting screen) for setting a detection threshold value at each inspection level as shown in FIG. 6 is displayed. On a Level Threshold Value Setting screen 600 in FIG. 6, a detection threshold value in a case where the distance between the scanned image (inspection image) of a printed material, which is the inspection target, and the RIP image as a reference image is evaluated as a distance is set. The inspection apparatus 108 determines that "there is no defect (OK)" in a case where the difference between the inspection image and the reference image is less than a set upper limit value (in this example, 0.3 mm) and determines that "there is a defect (NG)" in a case where the difference is larger than or equal to the upper limit value. The upper limit value is used in common in both scan inspection and RIP inspection. In contrast to this, a lower limit value (in this example, 0.5 mm) is used only in the case of RIP inspection. That is, in a case where the inspection method is RIP inspection, the inspection apparatus 108 checks whether the difference between the inspection image and the reference image (=RIP image) is inside or outside the range predefined by the upper limit value and the lower limit value, which are set, and determines "OK" in a case where the difference is outside the range and determines "NG" in a case where the difference is inside the range.

FIG. 7 is one example of a table (inspection level table) storing the threshold value of each inspection level, which is set via the Level Threshold Value Setting screen 600. In the inspection level table in FIG. 7, the threshold values are common to each inspection item of circular defect, linear defect, and positional shift. In the present embodiment, explanation is given by taking a case as an example where the difference between the inspection image and the reference image is evaluated by distance, but the indicator in a case where the presence/absence of a detection-target defect is evaluated is not limited to distance. For example, it may also be possible to use a different pattern, for example, such as tint, as the indicator in a case where the presence/absence of a defect is determined.

<Registration Processing of Reference Image>

Figure 8:
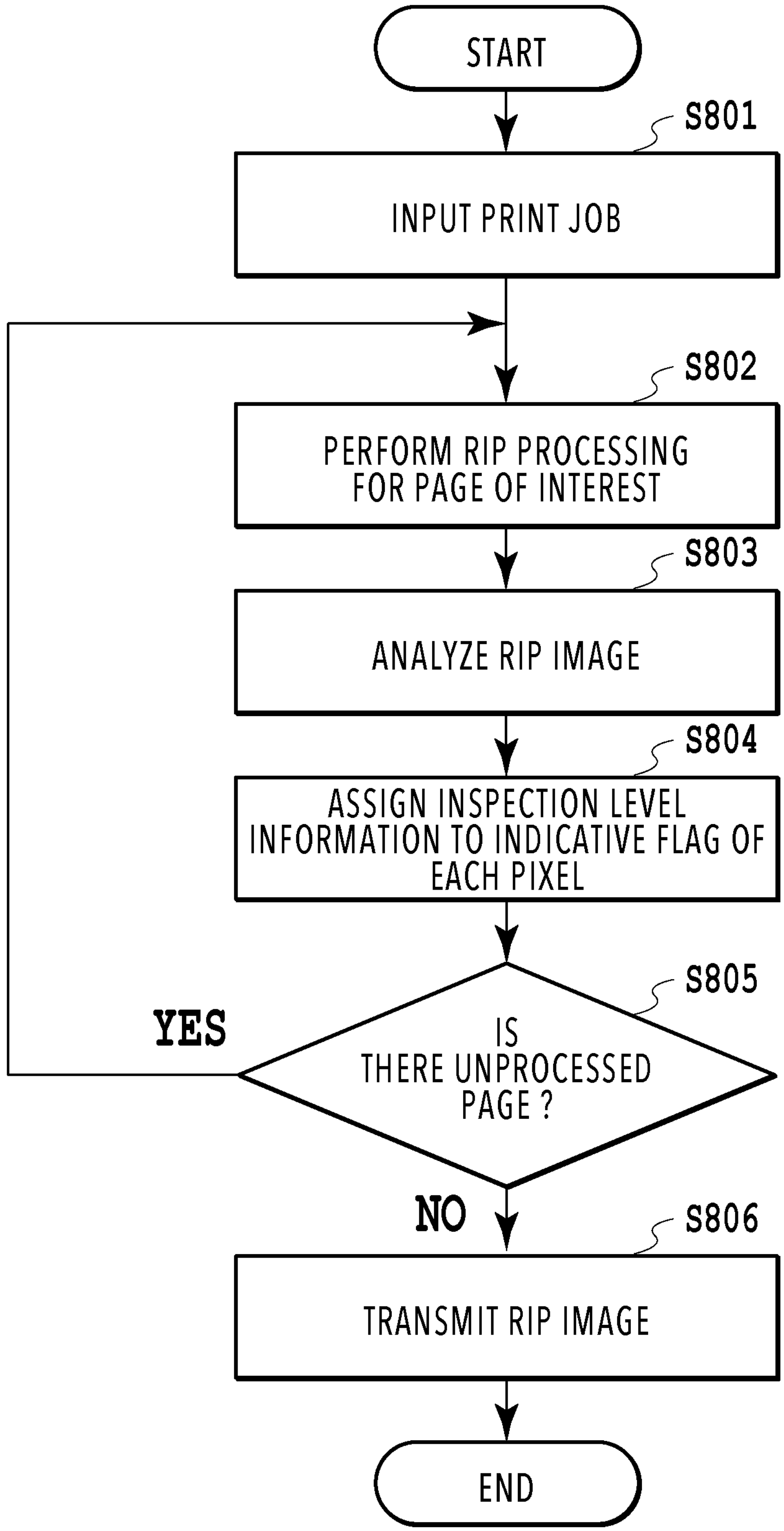
FIG. 8 is a flowchart showing a flow of processing to register a reference image for RIP inspection according to a first embodiment.

Following the above, processing to register a reference image for RIP inspection is explained. FIG. 8 is a flowchart showing a flow of processing to register a reference image for RIP inspection, which is performed in the external controller 109, and the flowchart is implemented by the CPU 234 executing a predetermined program. In the following, explanation is given along the flow in FIG. 8. It is assumed that before the registration processing of the reference image for RIP inspection is started, the above-described setting of the inspection level of each contents attribute has been completed (or a default setting value exists). In the following explanation, a symbol "S" means a step.

At S801, a print job is input from the client PC110, which is scheduled to perform RIP inspection for a completed printed material.

At S802, for the input print job, RIP processing is performed. Specifically, PDL (Page Description Language) included in the print job is interpreted and an image in the format that the image forming apparatus 101 can handle (called raster image or bitmap image, and in the following, described as "RIP image") is generated. At this time, an indicative flag for each pixel configuring the RIP image is also generated. The data of the RIP image and the indicative flag, which are generated, are stored in the storage unit 236.

Table 1 below is a specific example of the indicative flag.

TABLE 1

| | bit0 | bit1 | bit2 | bit3 | bit4 |
|---|---|---|---|---|---|
| Pixel (x, y) | 1 | 0 | 1 | — | — |

In Table 1 described above, bit 0 represents the presence/absence of an object (present: 1, absent: 0) and the two bits bit1 and bit2 represent an object attribute (Image: 00, Text: 11, Graphics: 01, Background: 00). Then, in the present embodiment, by using the two bits bit3 and bit4, inspection level information is assigned at S804, to be described later. In the present embodiment, it is assumed that inspection levels 1 to 3 (the larger the value, the stricter the inspection is) are represented respectively by two bits below.

inspection level 0: 00
inspection level 1: 01
inspection level 2: 10
inspection level 3: 11

At S803, the RIP image generated at S802 is analyzed and whether an object having the contents attribute described previously is included is determined. For this analysis, it may be possible to use a generally known image analysis algorithm, such as a face recognition algorithm and a barcode recognition algorithm, in accordance with the supposed contents attribute.

At S804, based on the analysis results at S803 and the inspection level of each contents attribute, which is set in advance, inspection level information is assigned to the indicative flag of each pixel, which is generated at S802. For example, it is assumed that as a result of analyzing the RIP image, the area of the image attribute to which the pixel having the indicative flag shown in Table 1 described above belongs represents a person and "inspection level 3" is set to the person. In this case, to the indicative flag shown in Table 1 described above, "11" representing inspection level 3 is assigned as inspection level information and the indicative flag is updated as shown in Table 2 below. That is, flag values for bit3 and bit4 of the indicative flag of the pixel are added.

TABLE 2

| | bit0 | bit1 | bit2 | bit3 | bit4 |
|---|---|---|---|---|---|
| Pixel (x, y) | 1 | 0 | 1 | 1 | 1 |

In this manner, for example, to the indicative flag of each pixel belonging to the area representing a person within the RIP image, inspection level information representing inspection level 3 is assigned. The processing such as this is performed similarly for the object (for example, "landscape", "character string", "barcode", "margin" and the like) having another contents attribute determined to exist within the RIP image by analysis. Then, the inspection apparatus 108 determines the inspection level that is applied to a target inspection image based on information represented by the two bits bit3 and bit4 in the indicative flag of each pixel configuring the reference image (RIP image).

At S805, whether or not the above-described processing is completed for all the pages designated in PDL of the print job input at S801 is determined. In a case where there is an unprocessed page, the processing returns to S802, and the next page is taken to be the processing target and the same processing is repeated. On the other hand, in a case where the processing is completed for all the pages, the processing advances to S806.

At S806, data of the RIP images of all the pages designated in PDL of the print job input at S801 is transmitted to the inspection apparatus 108 along with the above-described indicative flag of each pixel. Then, the inspection apparatus 108 stores the RIP image and the indicative flag, which are received, in the RAM 227 or the storage unit 228 in association with the job ID.

The above is the contents of the processing to register the reference image for RIP inspection according to the present embodiment. In the present embodiment, inspection level information is assigned to each pixel configuring the RIP image, but it may also be possible to assign it to each set (each area) of a plurality of pixels having the same contents attribute.

<Prior Check of Inspection Level>

Figure 9:
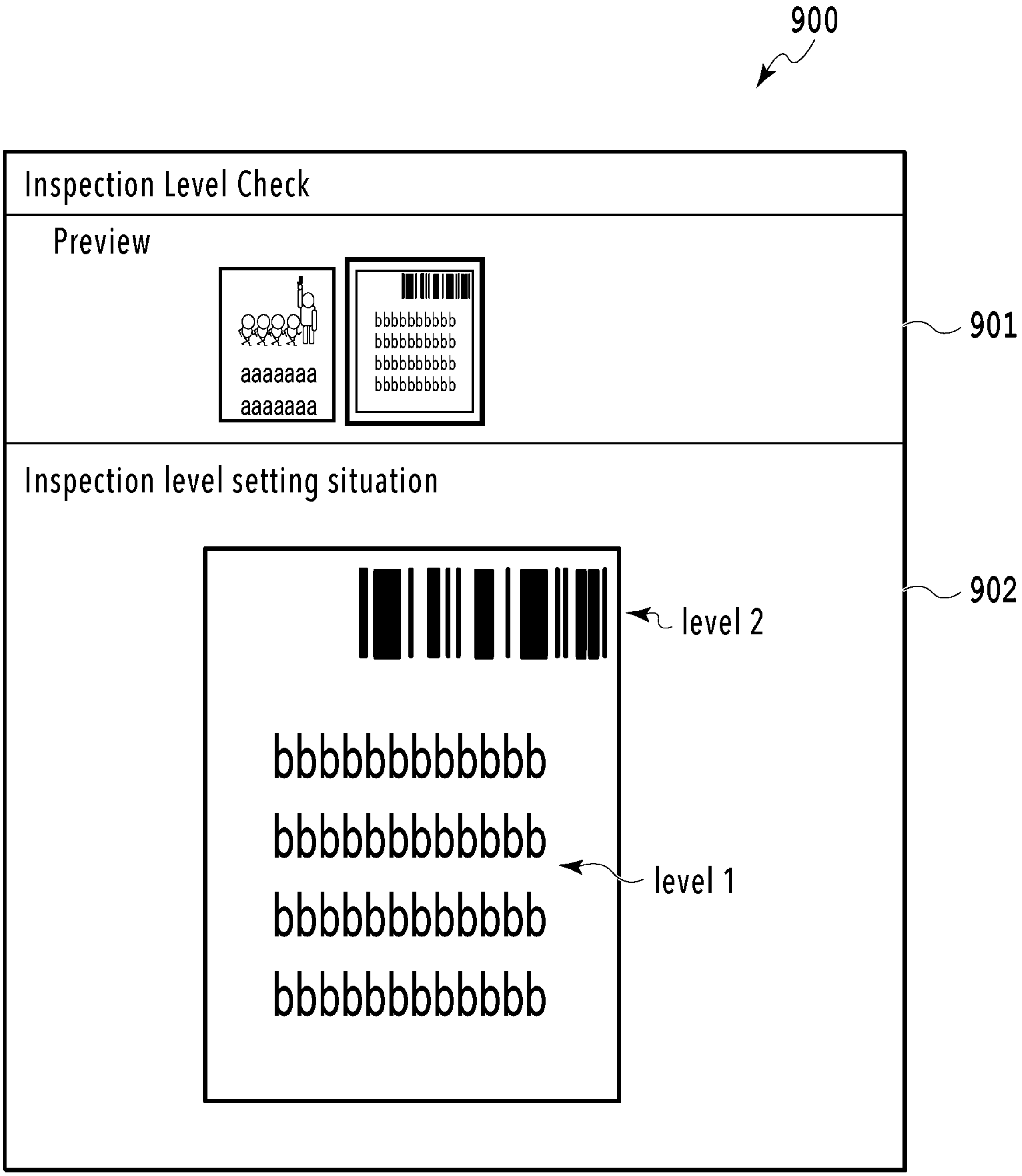
FIG. 9 is one example of an inspection level check screen according to the first embodiment.

FIG. 9 is one example of a UI screen (inspection level check screen) for a user having registered the reference image for RIP inspection performs prior check of the inspection level that is applied to a print job scheduled to be performed. The inspection level check screen such as this is displayed on the display unit 252 of the external controller 109 based on instructions of a user. An Inspection Level Check screen 900 shown in FIG. 9 includes a preview area 901 and a setting situation check area 902. In the preview area 901, images (thumbnail images) obtained by reducing the RIP images related to the target print job are displayed in a list and it is possible for a user to select any page with a mouse and the like. The selected thumbnail image is highlighted, such as that a thick frame is attached thereto. Then, the RIP image corresponding to the selected thumbnail image is displayed in the setting situation check area 902. At this time, the inspection level of each contents attribute existing in the RIP image is also displayed. Here, on the Inspection Level Check screen 900 shown in FIG. 9, the thumbnail images of the RIP images of the print job including two pages are displayed and the thumbnail image of the second page is selected. Then, the RIP image of the second page is displayed in the setting situation check area 902 and at the same time, information on the inspection level set for each of the barcode and the character string, which exist within the RIP image, is displayed to the right of the RIP image. In this manner, it is possible for a user to check the setting situation of the inspection level of each contents attribute in each page related to the print job after performing processing to register the reference image for RIP inspection.

<Operation of Inspection Apparatus>

Figure 10:
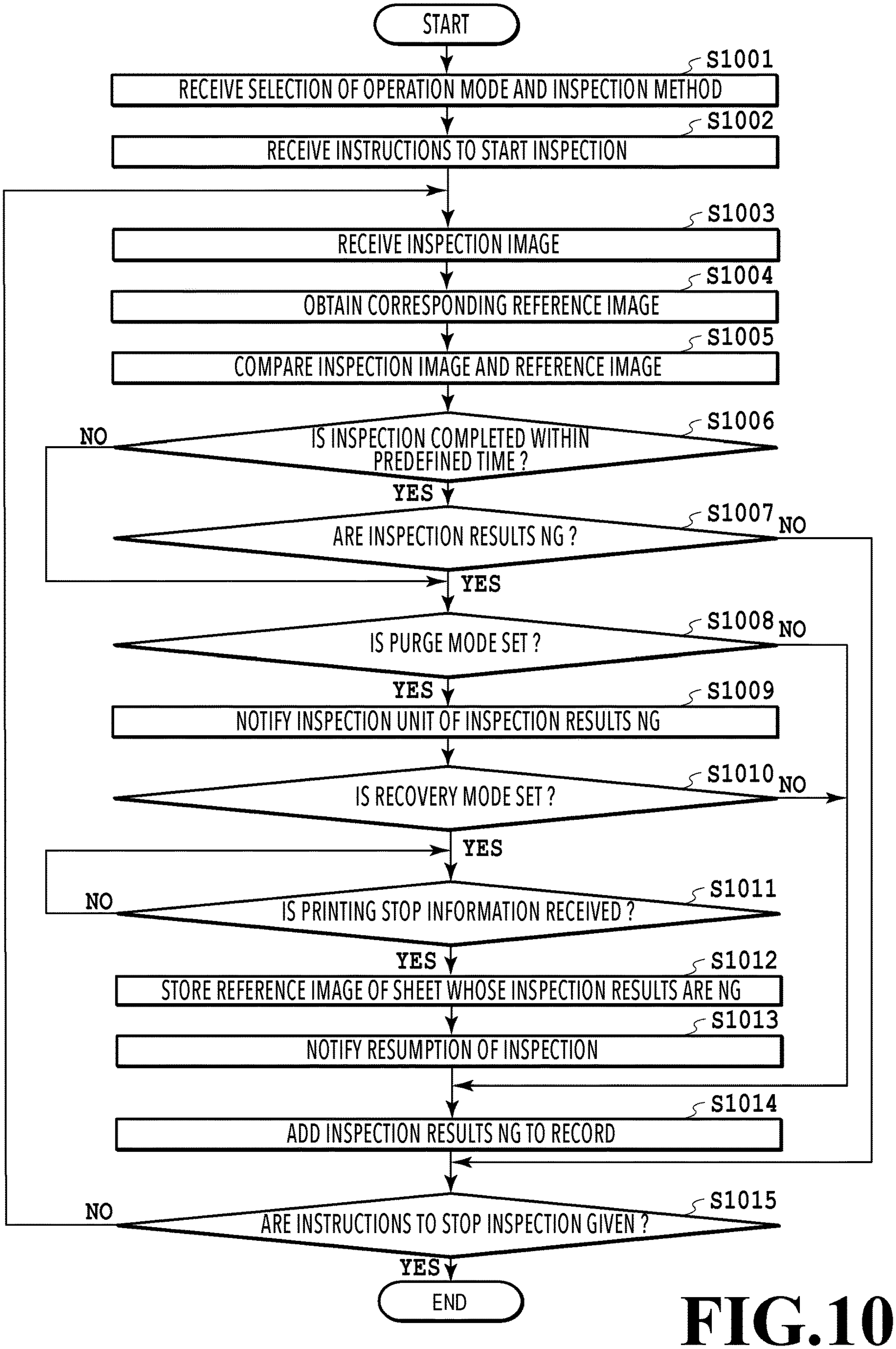
FIG. 10 is a flowchart showing a flow of inspection of a printed material in the inspection apparatus.

Following the above, the inspection that is performed by the inspection apparatus 108 is explained by taking a case of RIP inspection as an example. FIG. 10 is a flowchart showing a flow of the inspection of a printed material in the inspection apparatus 108 and this flowchart is implemented by the CPU 226 executing a predetermined program. In the following, explanation is given along the flow in FIG. 10. In the following explanation, a symbol "S" means a step.

At S1001, the user selection of the operation mode (including recovery setting in a case of purge mode) and the inspection method is received via the UI screen shown in FIG. 4A and FIG. 4B described previously.

Figure 11:
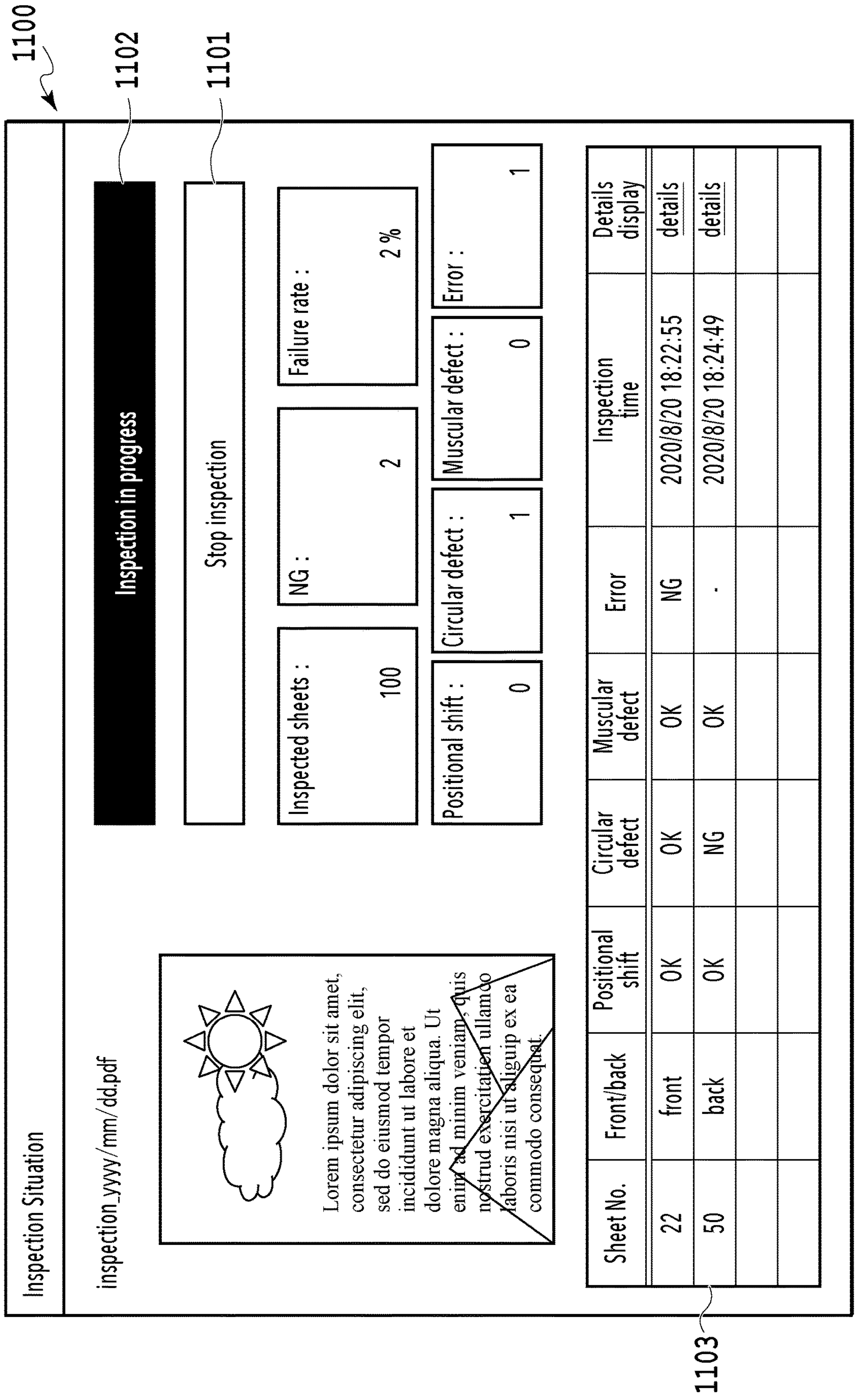
FIG. 11 is one example of an inspection situation screen.

Next, at S1002, via a predetermined UI screen that is displayed on the display unit 245, inspection start instructions are received. FIG. 11 is one example of a UI screen (inspection situation screen) for a user to check a variety of situations at the time of performing inspection. An Inspection Situation screen 1100 shown in FIG. 11 receives user instructions to perform/stop inspection, displays the progress situation and results of the inspection, and so on. A button 1101 is a button for a user to give instructions to perform inspection or stop inspection. In a case where a user presses down the button 1101, the character string on the button changes from "Start inspection" to "Stop inspection" and further, the character string in a status display area 1102 changes from "Not in operation" to "Inspection in progress". In a case where a user presses down the button 1101 again, the character string on the button changes to "Start inspection" again and the character string in the status display area 1102 also changes to "Not in operation" again. After this, the character string on the button 1101 and the character string in the status display area change in a toggle manner each time the button 1101 is pressed down.

At S1003, the scanned image (inspection image) of the inspection-target printed material is received from the inspection unit 106. At S1004 that follows, from the reference images registered by the flow in FIG. 8 described previously, the reference image of the page corresponding to the inspection image received at S1003 is read and obtained from the RAM 227. Then, at S1005, the received inspection image and the obtained reference image are compared. In this comparison, first, by using the feature point common to both images, position adjustment of the reference image and the inspection image is performed. Next, a difference is found by comparing the density values in both images for each pixel and threshold value processing in accordance with the inspection level set to the pixel is performed. At this time, the inspection level of each pixel is identified by information (inspection level information) represented by the two bits bit3 and bit4 of the corresponding indicative flag. In a case where the results of the processing indicate that a significant difference is not detected between the inspection image and the reference image, it is determined that "there is no defect (OK)". On the other hand, in a case where a significant difference is detected, it is determined that "there is a defect (NG)". Then, details of the determination results are recorded and also reflected on the Inspection Situation screen 1100 described above. In a case of the Inspection Situation screen 1100 in FIG. 11, the number of inspected sheets, the number of sheets whose inspection results are NG, the failure rate, and the number of occurrences for each cause of the inspection results NG are displayed real time during inspection. The number that is displayed in "Error" is the number of cases where timeout is reached because inspection is not completed within a predefined time. Further, at the bottom on the Inspection Situation screen 1100, an inspection NG list 1103 is displayed. In the inspection NG list 1103, each time "there is a defect (NG)" occurs, information on the sheet No., information on whether the occurrence position is on the front side or the backside of the sheet, information on the cause of NG, information on the detection time, and information on the link to an NG details screen (not shown schematically) are shown. In a case where a user selects a "details" button in a Details display field, a UI screen (not shown schematically) is displayed on the display unit 245, on which it is possible for a user to browse the captured image whose inspection results are NG, the position of the defect and the like. As the cause of NG, here, Positional shift, Circular defect (spot-shaped defect), and Linear defect (steak) are illustrated.

Next, at S1006, the next processing is distributed in accordance with whether or not the inspection is completed within the predefined time. In a case where the inspection is completed within the predefine time, the processing advances to S1007 and in a case where the inspection is not completed, the processing advances to S1008. The reason the determination such as this is performed is that in a case where inspection results are not obtained within a certain time, the subsequent sheet is scanned and the processing of the next inspection image is not performed in time. Further, the reason is that in a case where the purge mode is selected, in the large-capacity stacker 107, the conveyance destinations are switched so that the sheet whose inspection results are NG is discharged onto the top tray 320. Consequently, in a case where the inspection is not completed within the predefined time, it is not possible to determine that the inspection results are OK, and therefore, processing is performed by taking this case as an error.

At S1007, the next processing is distributed in accordance with whether or not the inspection results are "NG". In a case where the inspection results are "NG", the processing advances to S1008 and in a case of "OK", the processing advances to S1015.

At S1008, the next processing is distributed in accordance with whether or not the set operation mode is the purge mode. In a case where the set operation mode is the purge mode, the processing advances to S1009 and in a case where the set operation mode is not the purge mode, the processing advances to S1014.

At S1009, the inspection unit 106 is notified that the inspection results are "NG". Next, the processing advances to S1010 and the next processing is distributed in accordance with whether or not "recovery mode" is set. In a case where "recovery mode" is set, the processing advances to S1011 and in a case where "non-recovery mode" is set, the processing advances to S1014.

At S1011, the standby state is kept until printing stop information is received from the inspection unit 106. In a case where printing stop information is received, the processing advances to S1012.

At S1012, the reference image corresponding to the sheet whose inspection results are "NG" is read and obtained from the RAM 227 and the reference image is stored for use in comparison with the reprinted inspection image. Then, at S1013, the inspection unit 106 is notified of the resumption of inspection.

At S1014, to the inspection NG list 1103 within the above-described Inspection Situation screen 1100, information on the sheet whose inspection results are "NG" is added.

At S1015, whether or not to stop the inspection is determined. In a case where the pressing down of the button 1101 within the above-described Inspection Situation screen 1100 (in more detail, the change from "Start inspection" to "Stop inspection") is detected, it is determined that instructions to stop the inspection are given and the present processing is terminated. On the other hand, in a case where the instructions to stop the inspection as described above are not checked, the processing returns to AS1003 and the processing is continued by taking the next inspection image as a target.

The above is the contents of the RIP inspection that is performed by the inspection apparatus 108. The contents shown in the flow in FIG. 10 are one example and for example, the reception of instructions to start reading of the inspection image (S1002) may be automatic reception interlocked with instructions to start printing in the image forming apparatus 101, the external controller 109, and the client PC 110. Further, a configuration may be accepted in which inspection is stopped automatically in an interlocking manner with the termination of printing in the image forming apparatus 101 even though there are no instructions to stop inspection.

Modification Example

Figure 12:
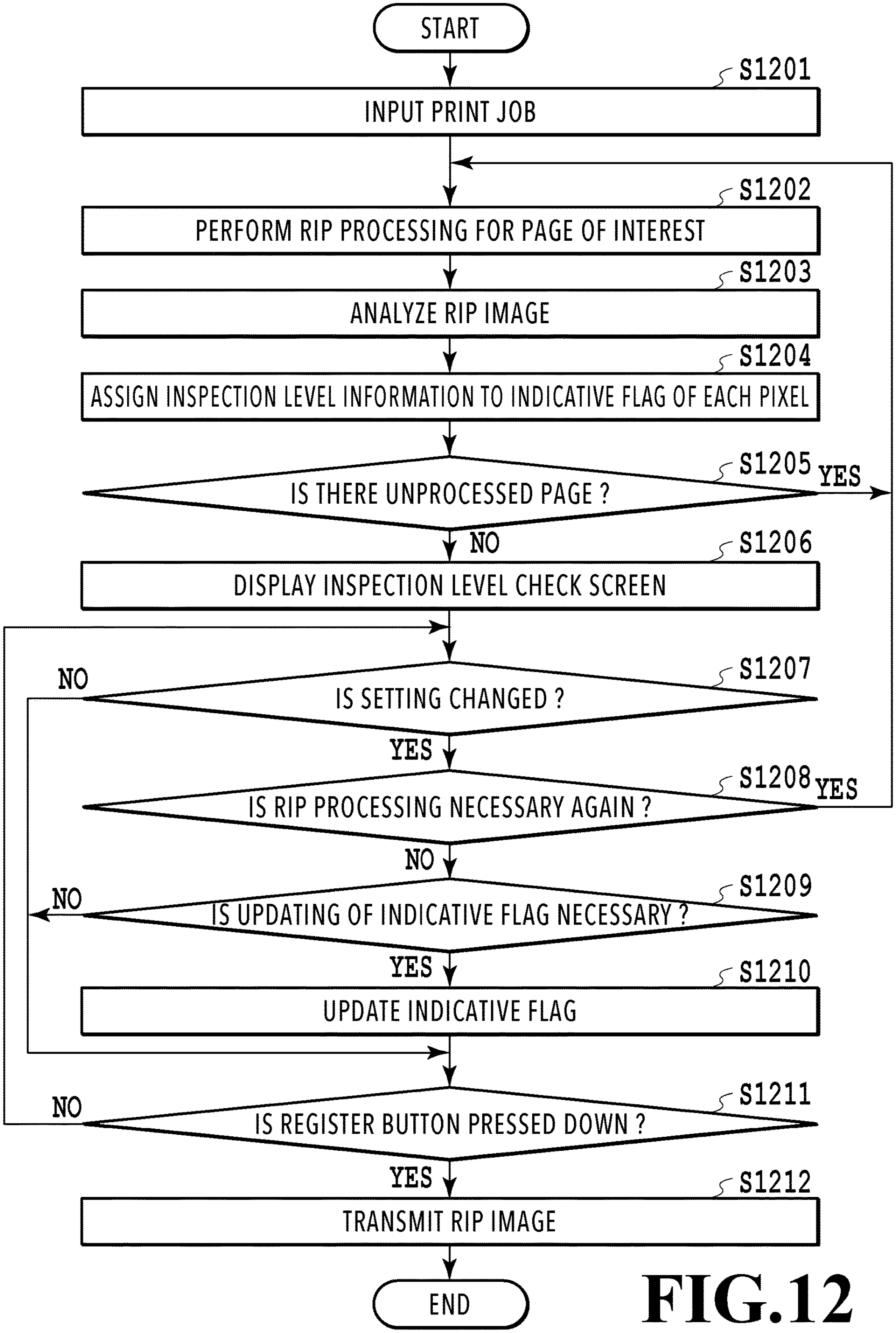
FIG. 12 is one example of a flowchart showing a flow of processing to register a reference image for RIP inspection according to a modification example.
Figure 13:
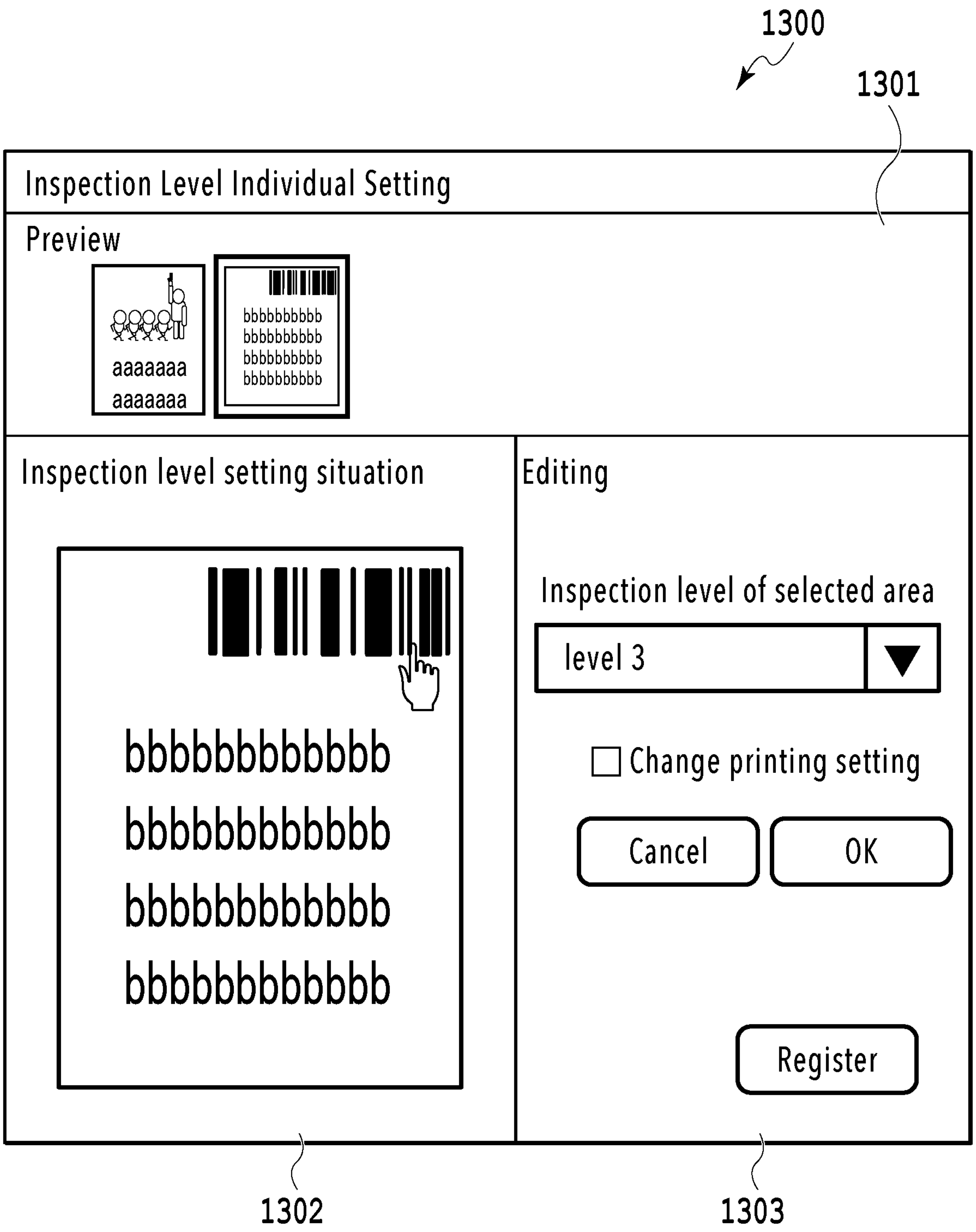
FIG. 13 is one example of an inspection level check screen according to the modification example.

In the embodiment described above, it is made possible to set an inspection level to the reference image for RIP inspection for each contents attribute that better matches the subjectivity of a user, not for each object attribute predefined in PDL. Then, it is possible for a user to check the inspection level in accordance with the type of contents on the UI screen (see FIG. 9) before the execution of the job for each page image of the target print job. It is desirable for a user to quickly change the set inspection level, for example, in a case of desiring to change the inspection level of a certain contents attribute by this check. Consequently, an aspect in which it is made possible for a user to easily change the inspection level set for each contents attribute is explained as a modification example of the first embodiment with reference to the flowchart shown in FIG. 12 and the UI screen shown in FIG. 13. FIG. 12 is one example of the flowchart showing a flow of processing to register a reference image for RIP inspection according to the present modification example and FIG. 13 is one example of the inspection level check screen according to the present modification example. In the following, points different from those of the above-described embodiment are explained mainly.

In a case where a print job scheduled to perform RIP inspection is input (S1201), RIP processing is performed for the print job and a RIP image of each page is generated (S1202). Following the above, the RIP image is analyzed (S1203) and inspection level information is assigned to the indicative flag of each pixel based on the obtained analysis results and the inspection level set for each contents attribute (S1204). Then, in a case where the above-described processing is completed for all the pages designated in PDL of the input print job is completed (YES at S1205), the processing advances to S1206.

At S1206, the inspection level check screen to which an editing function is added, which is shown as one example in FIG. 13, is displayed on the display unit 252. An inspection level check screen 1300 in FIG. 13 includes a preview area 1301, a setting situation check area 1302, and an editing area 1303. After selecting an area of a desired contents attribute with a mouse or the like in a RIP image displayed in the setting situation check area 1302, a user changes the inspection level for the selected area in the editing area 1303. A user who desires to change the inspection level of a specific area within the page selects a desired inspection level from a pulldown and presses down an "OK" button. The example in FIG. 13 shows the state where the area of barcode is selected and "inspection level 2" is changed to "inspection level 3". In the editing area 1303 on the inspection level check screen 1300 in FIG. 13, a checkbox for changing a variety of conditions (printing settings) at the time of printing, such as the sheet type, the number of printed copies, single-sided/double-sided printing, and Nin1 printing, also exists. In a case where a user desires to change the printing setting as well as the inspection level (or the printing setting alone), it is possible for the user to change the variety of conditions at the time of printing on a printing setting screen (not shown schematically), which is displayed separately, by checking the checkbox and pressing down the "OK" button.

At S1207, whether the setting change operation has been performed in the editing area 1303 is determined. In a case where the setting change operation has been performed, the processing advances to S1208 and in a case where the setting change operation has not been performed, the processing advances to S1210. Then, at S1208, whether or not the contents of the setting change performed by the user require the RIP processing again is determined. In a case where the setting change that entails the change of the print layout, such as Nin1 printing, has been performed, it is determined that the RIP processing needs to be performed again, and therefore, the processing returns to S1202 and the RIP processing is performed from the beginning. On the other hand, in a case where the contents of the setting change does not require the RIP processing again, the processing advances to S1209.

At S1209, whether or not the contents of the setting change performed by the user require updating of the indicative flag (in more detail, updating of inspection level information) is determined. As one specific example in which it is determined that updating is necessary, there is a case where the inspection level for a certain area in a certain RIP image is changed. As another example, there is a case where the printing setting is changed from the normal printing to Nin1 printing, bookbinding printing or the like. The reason is that in a case of the printing setting change such as this, a margin is generated newly within one sheet, and therefore, it becomes necessary to newly add inspection level information on the margin to the indicative flag. In a case where the change is determined to require updating of the indicative flag such as this, the processing advances to S1210. On the other hand, in a case where the change is determined not to require updating of the indicative flag, the processing advances to S1211.

At S1210, the inspection level information within the indicative flag is changed in accordance with the changed inspection level and the indicative flag is updated with the changed contents.

At S1211, whether or not a "Register" button within the editing area 1303 is pressed down is determined. In a case where the pressing down of the "Register" button is detected, the processing advances to S1212. On the other hand, in a case where the pressing down of the "Register" button is not detected, the processing returns to S1207 and the processing is continued.

At S1212, as at S806, data of the RIP images for all the pages designated in PDL of the input print job is transmitted to the inspection apparatus 108 along with the indicative flag of each pixel. The above is the contents of the processing to register the reference image for RIP inspection according to the present modification example.

As above, according to the present embodiment, it is possible to easily set an inspection level for each contents attribute more intuitive to a user at the time of RIP inspection.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to easily set an inspection level in accordance with a type of contents included in a printed material.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-145599, filed Sep. 13, 2022 which is hereby incorporated by reference wherein in its entirety.

What is claimed is:

1. An information processing apparatus comprising:

one or more memories storing instructions; and one or more processors executing the instructions to:

generate a raster image based on a print job of a printed material;

identify a contents attribute different from an object attribute predefined by the print job by analyzing the raster image;

automatically assign inspection level information in accordance with the identified contents attribute to the generated raster image; and output the raster image to which the inspection level information is assigned for use as a reference image in the inspection, wherein assignment of the inspection level information is performed for each set of a plurality of pixels having the same contents attribute among pixels configuring the raster image.

2. The information processing apparatus according to claim 1, wherein the one or more processors further execute the instructions to:

set an inspection level in accordance with each contents attribute and assignment of the inspection level information is performed based on an inspection level in accordance with each set contents attribute.

3. The information processing apparatus according to claim 2, wherein the one or more processors further execute the instructions to:

cause a display unit to display a first user interface screen for designating each contents attribute and an inspection level in association with each other and setting of the inspection level is performed based on user instructions via the first user interface screen.

4. The information processing apparatus according to claim 3, wherein the one or more processors further execute the instructions to:

display, based on user instructions, a second user interface screen for checking in advance the inspection level that is applied to the print job scheduled to be performed on the display unit.

5. The information processing apparatus according to claim 4, wherein the second user interface screen receives selection of an area in the raster image by a user and a change of an inspection level for the selected area and the one or more processors further execute the instructions to:

update the inspection level information in accordance with the changed inspection level.

6. The information processing apparatus according to claim 5, wherein the second user interface screen further receives a change of printing setting for the print job scheduled to be performed and in a case where the raster image in accordance with the changed printing setting is generated, inspection level information in accordance with a contents attribute identified by analysis of the raster image is assigned to the raster image.

7. The information processing apparatus according to claim 2, wherein the inspection level is associated with a threshold value corresponding to an indicator for evaluating the presence/absence of a defect that is a detection target in the inspection.

8. The information processing apparatus according to claim 7, wherein the indicator is distance or tint.

9. The information processing apparatus according to claim 1, wherein in the contents attribute, at least one of person, landscape, character string, barcode, and margin is included.

10. An information processing apparatus comprising:

one or more memories storing instructions; and one or more processors executing the instructions to:

generate a raster image based on a print job of a printed material;

identify a contents attribute different from an object attribute predefined by the print job by analyzing the raster image;

automatically assign inspection level information in accordance with the identified contents attribute to the generated raster image; and output the raster image to which the inspection level information is assigned for use as a reference image in the inspection, wherein assignment of the inspection level information is performed for each pixel configuring the raster image.

11. A system comprising:

one or more memories storing instructions; and one or more processors executing the instructions to:

generate a raster image based on a print job of a printed material;

identify a contents attribute different from an object attribute predefined by the print job by analyzing the raster image;

automatically assign inspection level information in accordance with the identified contents attribute to the generated raster image;

output the raster image to which the inspection level information is assigned for use as a reference image in the inspection; and inspect the printed material based on the print job in accordance with the inspection level information by using the raster image to which the output inspection level information is assigned as the reference image, wherein assignment of the inspection level information is performed for each set of a plurality of pixels having the same contents attribute among pixels configuring the raster image.

12. An information processing method comprising:

generating a raster image based on a print job of a printed material;

identifying a contents attribute different from an object attribute predefined by the print job by analyzing the raster image;

assigning, automatically, inspection level information in accordance with the identified contents attribute to the generated raster image; and outputting the raster image to which the inspection level information is assigned for use as a reference image in the inspection, wherein assignment of the inspection level information is performed for each set of a plurality of pixels having the same contents attribute among pixels configuring the raster image.

13. A non-transitory computer readable storage medium storing a program for causing a computer to perform an information processing method comprising:

generating a raster image based on a print job of a printed material;

identifying a contents attribute different from an object attribute predefined by the print job by analyzing the raster image;

assigning, automatically, inspection level information in accordance with the identified contents attribute to the generated raster image; and outputting the raster image to which the inspection level information is assigned for use as a reference image in the inspection, wherein assignment of the inspection level information is performed for each set of a plurality of pixels having the same contents attribute among pixels configuring the raster image.

* * * * *